United States Patent
Miller et al.

(10) Patent No.: US 8,050,800 B2
(45) Date of Patent: Nov. 1, 2011

(54) METHOD AND SYSTEM FOR MEETING END CONDITIONS IN A MOTION CONTROL SYSTEM

(75) Inventors: Daniel H. Miller, Charlottesville, VA (US); William Lindsay Morrison, Charlottesville, VA (US)

(73) Assignee: GE Intelligent Platforms, Inc., Charlottesville, VA (US)

( * ) Notice: Subject to any disclaimer, the term of this patent is extended or adjusted under 35 U.S.C. 154(b) by 984 days.

(21) Appl. No.: 11/875,911

(22) Filed: Oct. 21, 2007

(65) Prior Publication Data
US 2009/0105883 A1    Apr. 23, 2009

(51) Int. Cl.
| | |
|---|---|
| G06F 17/00 | (2006.01) |
| G06F 19/00 | (2011.01) |
| G05B 19/00 | (2006.01) |
| G05B 13/00 | (2006.01) |
| G05B 11/01 | (2006.01) |
| G05B 19/19 | (2006.01) |

(52) U.S. Cl. .......... 700/275; 700/90; 700/245; 700/262; 318/631; 318/568.11
(58) Field of Classification Search ................. None
See application file for complete search history.

(56) References Cited

U.S. PATENT DOCUMENTS

| | | | | |
|---|---|---|---|---|
| 3,699,317 | A * | 10/1972 | Middleditch | 700/187 |
| 4,506,335 | A * | 3/1985 | Magnuson | 700/252 |
| 4,769,583 | A * | 9/1988 | Goor | 318/568.18 |
| 5,070,287 | A * | 12/1991 | Boehm | 318/569 |
| 5,396,160 | A * | 3/1995 | Chen | 318/573 |
| 5,832,188 | A * | 11/1998 | Papiernik | 700/245 |
| 7,110,212 | B2 * | 9/2006 | Bui et al. | 360/77.12 |
| 2006/0190136 | A1 * | 8/2006 | Boyer | 700/245 |

OTHER PUBLICATIONS

GE Fanuc Automation: "Pacmotion Multi-Axis Motion Controller & World Class Fanuc AC Servos" Internet Article, 2006, p. 1-4 XP002508021.

* cited by examiner

Primary Examiner — Ryan Jarrett
Assistant Examiner — Sunray Chang
(74) Attorney, Agent, or Firm — GE Global Patent Operation; Mark A. Conklin; Catherine J. Toppin

(57) ABSTRACT

One embodiment of a system and method for meeting end conditions of a path plan utilizing a path generator that continuously generates commands for a path plan while tracking the total time expired in the path plan. The path generator computes the time remaining in the path plan and substitutes the remaining time for the length of the final sample period in the path plan when the length of the remaining time is less than the length of a full sample period.

8 Claims, 5 Drawing Sheets

METHOD AND SYSTEM FOR MEETING END CONDITIONS IN A MOTION CONTROL SYSTEM

BACKGROUND OF THE INVENTION

1. Field of the Invention

The subject matter described herein relates generally to a system and method for meeting end conditions determined by a continuous time path planning method for motion control systems, more particularly path planners.

2. Related Art

Path planners or path generators typically comprise motion controllers that are used to control motors. The motors that employ path planning can be found in various industrial systems such as manufacturing, assembling, packaging and other capacities. These motors typically control the movements of elements such as drill bits or robotic arms. Path generators determine the movements of the controlled elements.

Path generators use various kinetic path algorithms along with discrete time controllers. The use of discrete time controllers with continuous time path planning algorithms creates problems for meeting the end conditions of the path plan. The path plan is comprised of movements that are determined on a continuous basis and not within a sampling period. A discrete time controller is limited to outputting data on a predetermined sampling period. An example of a problem that arises in the above situation is that the determined movement may be an end condition such as an instruction to halt at a point in time that occurs before the next sampling period. This problem can result in the discrete time controller not instructing the motor to halt before the next sample period, possibly resulting a less desirable path being followed that violates the constraints of the move, for example.

Prior path generators implemented a compensation scheme that altered the initial conditions at the start of deceleration such that the end conditions would be reached on an even sample period, e.g. every 5 ms. Although computationally desirable, it is not desirable to the controller application because it introduces an uncontrolled step change to the output at that point. This creates a discontinuity in the planned path. Similarly, other known time compensation schemes are undesirable due to significant increases in computational load.

Accordingly, there is a need for a more accurate, improved time compensation scheme when utilizing a continuous time path planning with a discrete time controller to meet end conditions.

BRIEF SUMMARY OF THE INVENTION

One embodiment of the invention is a system and method for meeting end conditions of a path plan that implements a path generator that continuously generates commands for a path plan while tracking the total time expired for the path plan. The path generator computes the time remaining in the path plan and substitutes the remaining time for the length of the final sample period when the length of remaining time is less than the length of a full sample period.

DETAILED DESCRIPTION OF THE INVENTION

One embodiment of the present invention includes a method and system for path planning utilizing a continuous path plan implemented in a discrete time controller.

Figure 1:
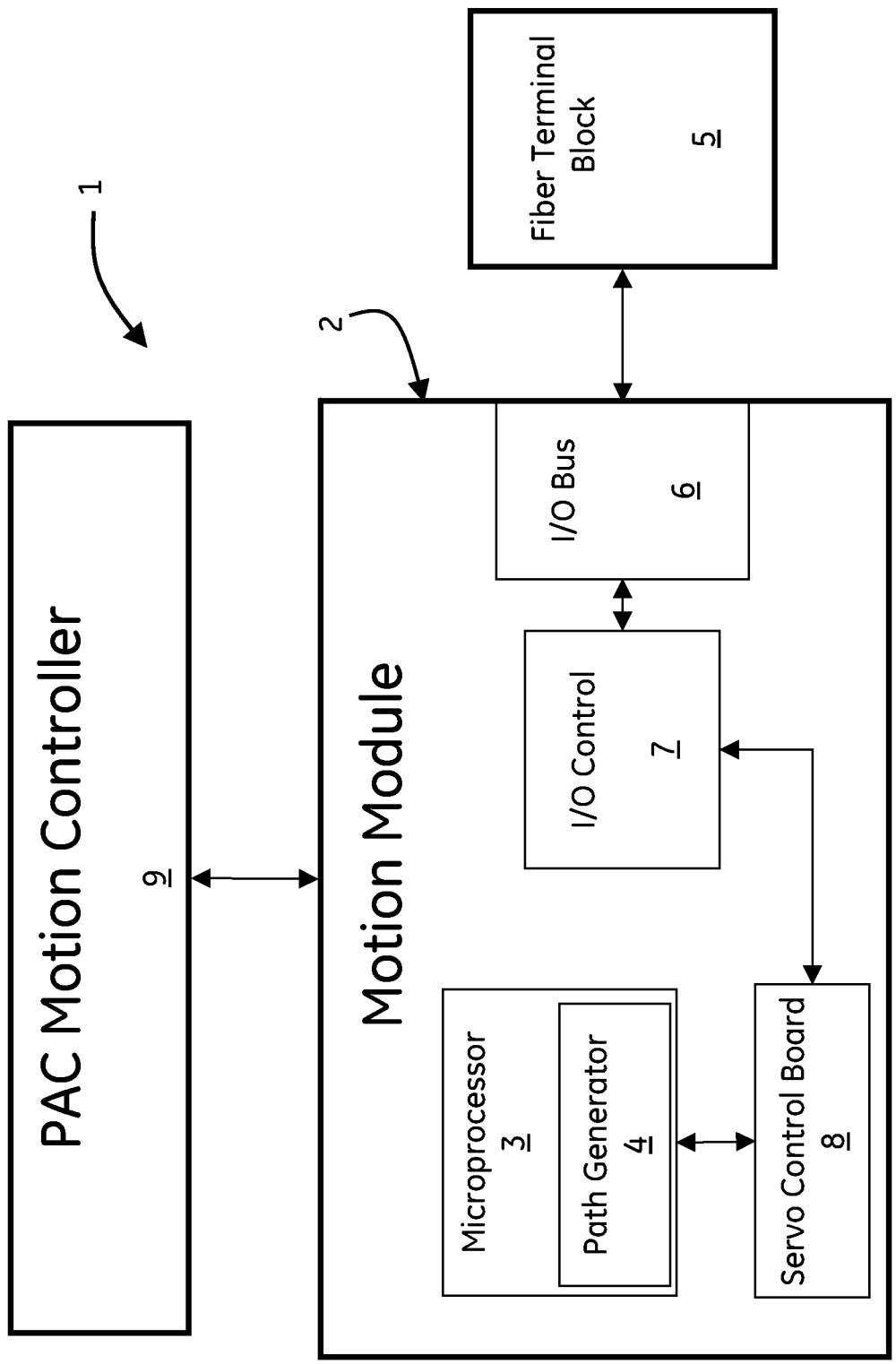
FIG. 1 is a schematic diagram of a control system implementing a path plan according to the method of one embodiment of the invention.

Referring now to FIG. 1, a block diagram of a Programmable Automation Controller (PAC) type motion system 1 for path planning is shown according to one embodiment of the present invention. The PAC system 1 includes a PAC system type motion controller 9, a PAC system type motion module (PMM) fiber terminal block 5 and a (PMM) motherboard 2 comprising a microprocessor subsystem 3. PMM motherboard 2 further includes several subsystems including a path generator 4. Path generator 4 is a firmware subsystem that runs on microprocessor 3 that is dedicated to path planning. Other firmware subsystems that support the functions of PMM motherboard 2 include a communication bus 6, such as a PCI backplane, and other associated hardware support functions.

PAC system 1 may include an input/output (I/O) module 7 for receiving various status, alarm, or input signals from devices. I/O module 7 is coupled to input and output devices. Although only one I/O module is shown in FIG. 1, the PAC system may include multiple I/O modules, for example, an I/O module for interfacing to a motor.

The PAC motion system also includes a PMM servo control board 8. The servo control board 8 may be a daughterboard that is hosted inside the motion control module (PMM). The servo control board serves as a motion controller for the controlled elements such as robotic arms, for example.

The path generator 4 engages in path generation. Path generation refers to the derivation of a commanded trajectory in real-time between an initial position and a target position. According to one embodiment of the present invention, the path generator 4 defines the minimum time path between an initial position and a target position without violating the user supplied input command values. The path generator provides a path profile based on specified motion parameters. The specified motion parameters include the following command inputs: end position, maximum velocity, maximum acceleration, maximum deceleration, and commanded jerk. The initial conditions of a movement are defined by the current state of the path generator making initial position, initial velocity, initial acceleration, and initial jerk known values.

Jerk is defined as the rate of change of acceleration or acceleration slope. Thus, jerk is the derivative of acceleration and is an important variable in many applications where a smooth start is required. Jerk control is also important to reduce machine wear. The kinematic equations for generating constant jerk paths from an initial position to a final position subject to acceleration, deceleration, and velocity constraints are well known. Therefore, the known values stated above along with the kinematic equations form an equation set that can be then solved for the unknowns to yield the desired trajectory.

The interrelated kinematic equations can be solved prior to performing any motion based on the known/unknown variables. This method, although algebraically and numerically challenging, results in a solution. In a preferred embodiment, the microprocessor utilizes constant jerk mode to calculate the path plan in real time. In other words, jerk is the controlled variable, and acceleration and velocity are maximum values.

In one embodiment of the present invention, the path generator 4 utilizes a two-phase trajectory generation method that breaks a movement into two phases. In the first phase, the move is commanded to through acceleration or deceleration to reach constant velocity. In the second phase, the path generator constantly monitors the move in-progress to determine the point at which deceleration must start to reach the target position or desired final conditions. The two-phase trajectory generation is performed prior to any motion.

Figure 2:
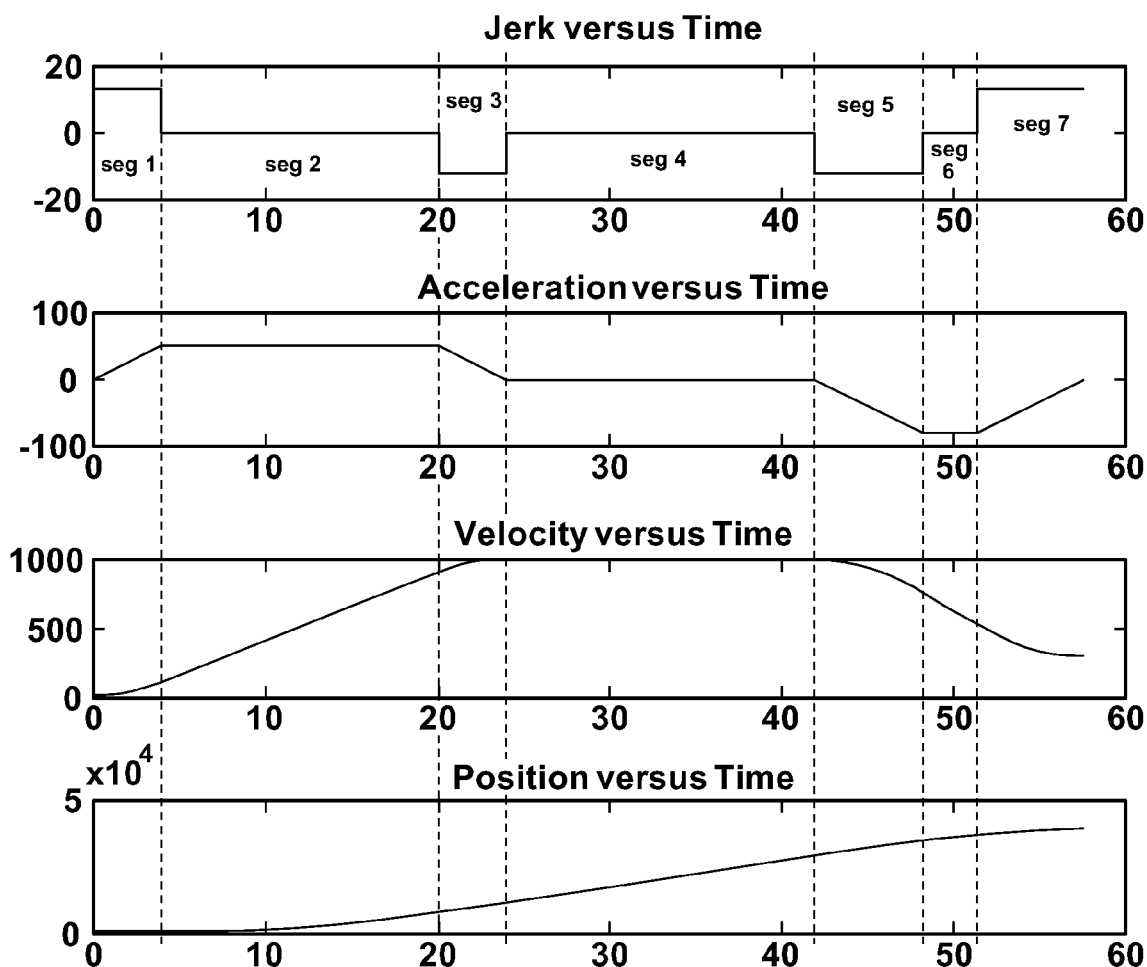
FIG. 2 is a stacked, graphical depiction of the seven-segments of a basic move type generated by the path plan of FIG. 1.

Referring now to FIG. 2, a graphical representation of a path command is shown versus time on a common time scale that was generated using the two-phased method. FIG.2 further illustrates a basic move where seven segments are required to complete the move. More specifically, the seven-segments include three segments in the first phase, a constant velocity segment (segment 4), and three segments in the second phase. In FIG. 2, jerk is constant in each segment. This two-phased move with a constant velocity segment results from a point-to-point move where all of the non-controlled variables reach maximum values. In FIG. 2, velocity, acceleration, and deceleration all reach their maximum value. Table 1 describes each segment and its unique aspects.

TABLE 1

| Segment Number | Description |
|---|---|
| 1 | Constant jerk segment utilizing the specified jerk to control the increase in acceleration rate. The segment ends once either the maximum constant acceleration is reached and jerk changes to zero, or it is necessary to reduce the acceleration rate to meet the desired end conditions. |
| 2 | Zero jerk/constant acceleration segment where constant acceleration is the supplied maximum value. The segment ends when it is necessary to command a constant jerk to reduce acceleration to reach either the user specified maximum velocity or a value less than the maximum required for the move to reach desired end conditions. |
| 3 | Constant negative jerk segment utilizing the specified jerk to control the decline in acceleration rate. The segment ends once acceleration and jerk are zero and either the specified maximum constant velocity is reached or the peak velocity necessary to reach end conditions is met. |
| 4 | Zero jerk, zero acceleration, and constant velocity segment. The segment ends when it becomes necessary to command a negative constant jerk to decelerate to reach the desired position. |
| 5 | Constant negative jerk segment utilizing the specified jerk to control the increase in deceleration rate. The segment ends once constant deceleration is reached and jerk becomes zero or it is necessary to reduce the deceleration rate to meet the desired end conditions. |
| 6 | Zero jerk, constant deceleration segment where the constant deceleration is supplied. The segment ends when it is necessary to command a jerk to reduce the deceleration rate to reach the desired end conditions. |
| 7 | Constant jerk segment utilizing the specified jerk to control the decline in deceleration rate. The segment ends once motion reaches desired end conditions. |

Jerk controlled motion can be used but is not necessary. The method of the present invention can be utilized using any controlled motion when the times of the moves are determined. The ideal path trajectory is known and can lie somewhere between the two sample periods. In order for the end conditions to be met, path generator 4 must compensate for the difference between the end time of the path plan and the sampling period on which the movements are commanded to the motion controller.

Figure 3:
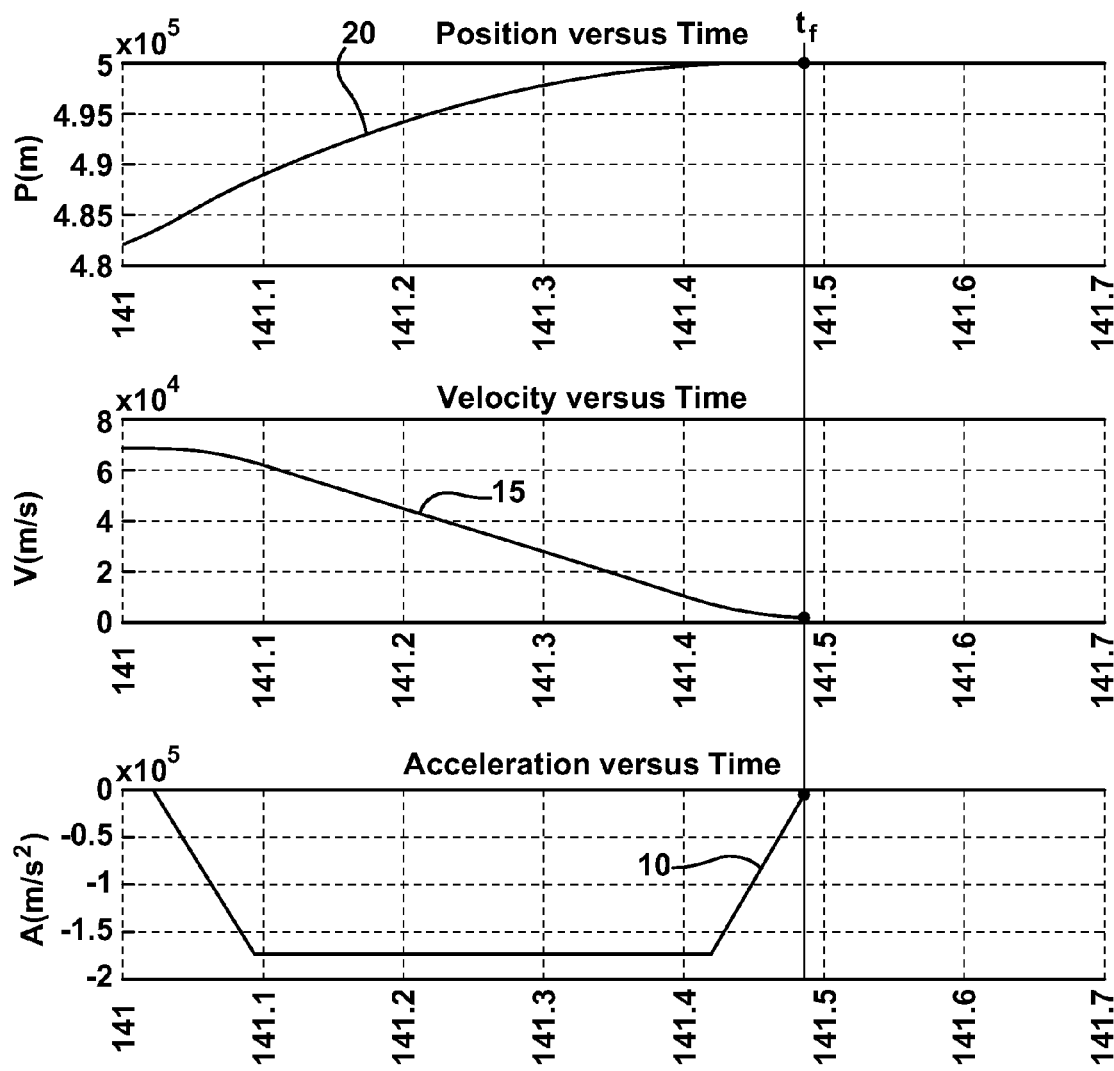
FIG. 3 is a graphical representation of acceleration and velocity versus time nearing the end of the path plan.

For example, referring now to FIG. 3, a graphical representation of acceleration, velocity, and position versus time nearing the end of a sample path plan is shown. The time values indicated in FIG. 3 are for example only and are not limiting the invention. The graph representing acceleration versus time illustrates a zero jerk, constant deceleration segment where the constant deceleration is supplied approximately between 141.1 and 141.4 microseconds. The segment ends when it is necessary to command a jerk to reduce the deceleration rate to reach the desired end conditions. A constant jerk segment is shown beginning after 141.4 microseconds utilizing the specified jerk to control the decline in deceleration rate 10. The segment ends once the motion reaches the desired end conditions. Time $t_r$ represents the end point on a sample period for the path plan. Furthermore, the graph representing velocity versus time illustrates the velocity of the motion approaching zero meters per second nearing the end of the path plan 15. In this example, the final end conditions require motion to stop between 141.4 and 141.5 microseconds. The graph representing position versus time shows the position of a controlled element at the stopping point.

Figure 4:
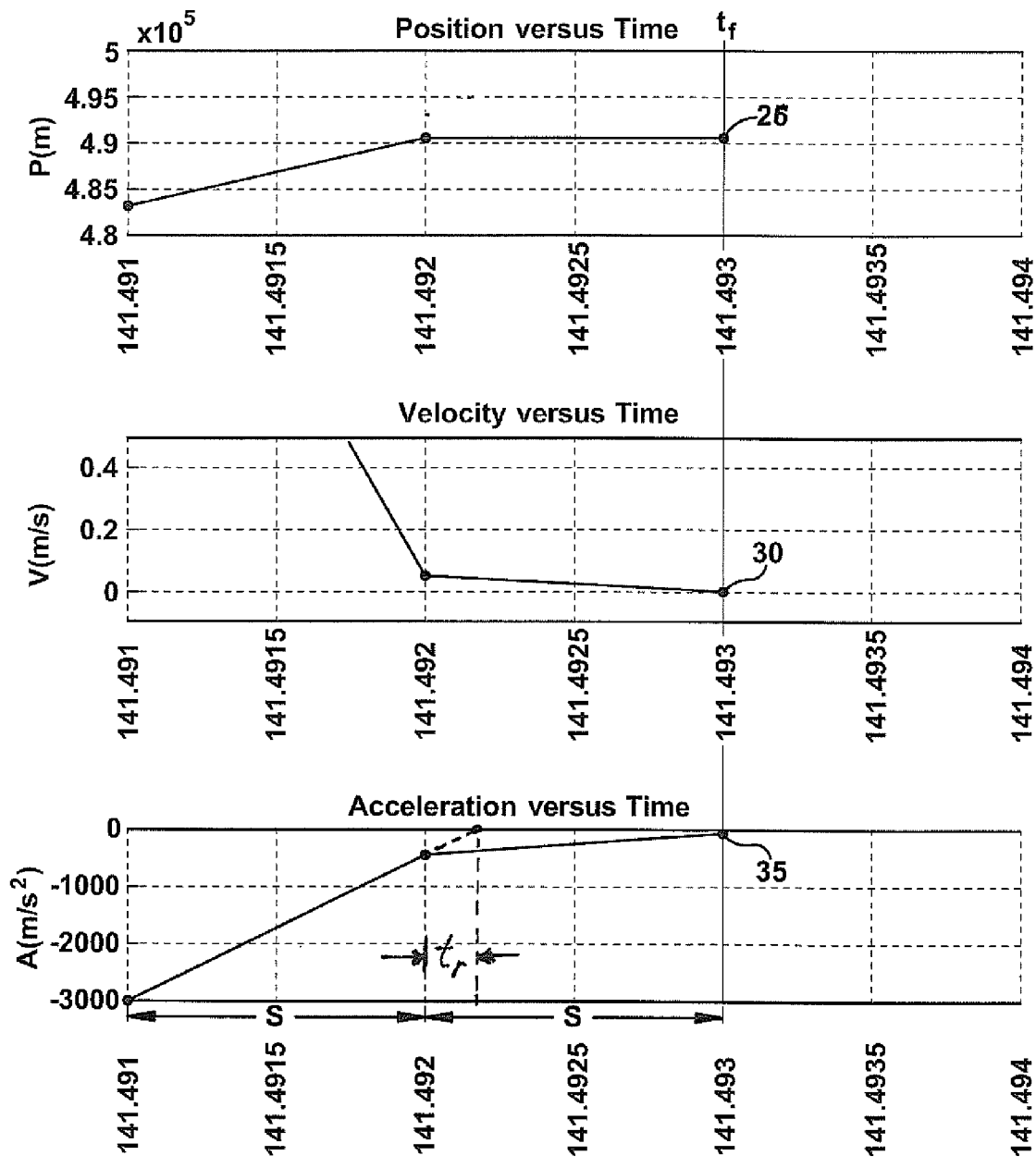
FIG. 4 is a magnified view of FIG. 3.

Referring now to FIG. 4, a magnified view of the graphical representation of FIG. 3 is shown. The time values indicated in FIG. 4 are for example only and are not limiting the invention. FIG. 4 shows a move reaching its stopping point between sample periods. Although a sample period(s) of one microsecond is used, other sample times may be used as well. The graph 35 shows acceleration nearing 0 m/s$_2$ once the motion reaches the desired end conditions between 141.492 and 141.493 near 141.492 microseconds. Time $t_r$ represents the remaining time in the path plan and $t_r$ represents the end point on a sample period for the path plan. Furthermore, the graph representing velocity versus time illustrates the velocity of the motion approaching 0 m/s nearing the end of the path plan 30. The graph representing position versus time shows the position of a controlled element at the stopping point 26.

Figure 5:
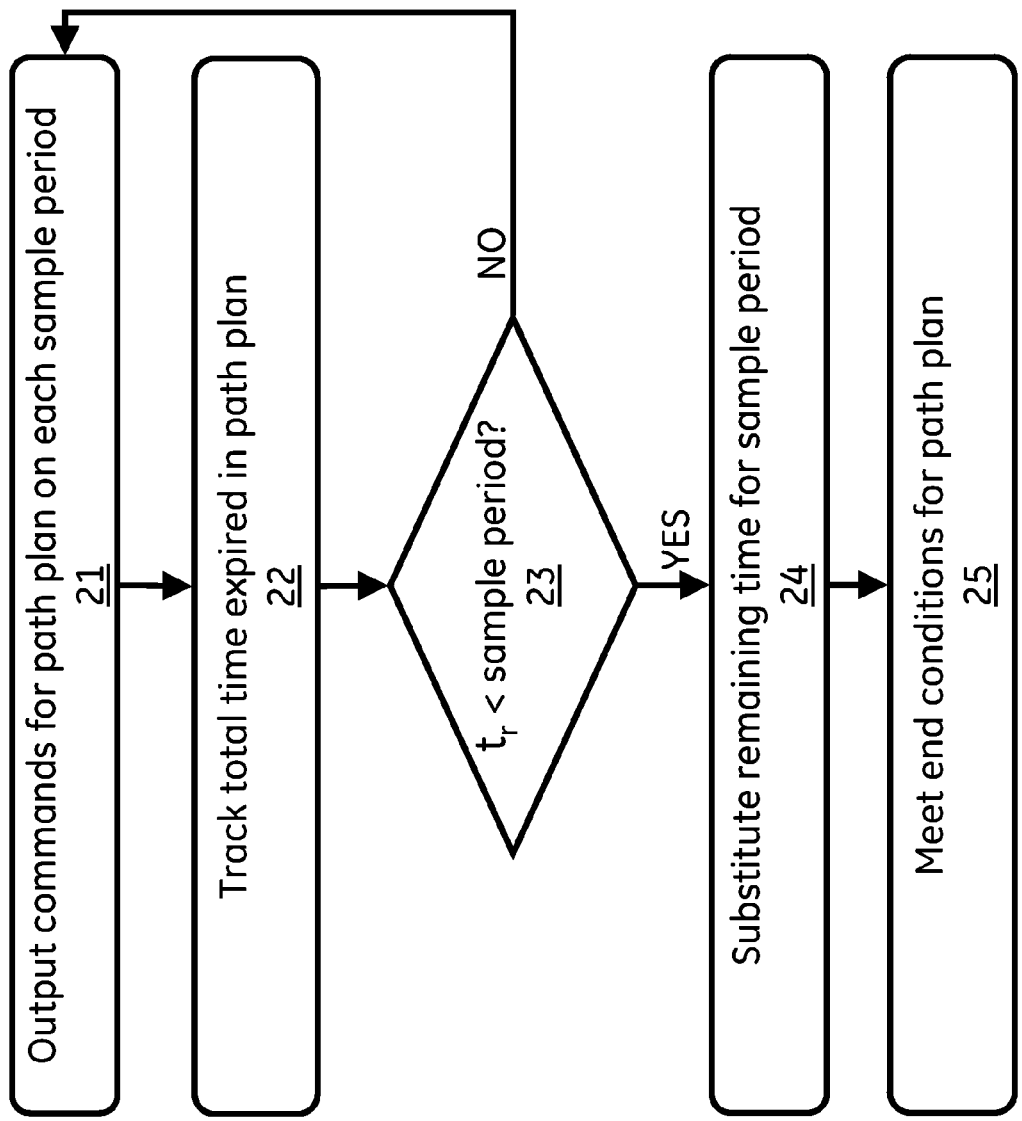
FIG. 5 is a method according to one embodiment of the invention for a path generator to meet end conditions of a path plan.

Referring now to FIG. 5, a method is shown for path generator 4 to meet end conditions of a path plan derived from any continuous path-planning algorithm including the one described above. Path generator 4 computes the desired time when the path will reach the end conditions in real time. Path generator 4 is not constrained by the discrete sampling period of the discrete time controller that is used to regulate the timing of the when the commands are outputted to the controlled elements. Path generator 4 generates the movement commands for the path and the discrete time controller outputs the commands in step 21. Path generator 4 keeps track of the total time lapsed in the path plan in step 22 and computes the time remaining $t_r$ in the path plan. In step 23, path generator 4 compares the length of time remaining $t_r$ to the length of time of a full sample period. If the remaining time $t_r$ is less than a full sample period, the path generator moves on to step 24 and substitutes the length of the remaining time $t_r$ for the length of a full sample period in the path-planning algorithm. Path generator 4 meets the end conditions of the path plan in step 25 by calculating end values by treating the remaining time as the final sample period so that the discrete time controller will output the command for the end conditions to a controlled element. Furthermore, the end values calculated by the method described are checked against the final end conditions of the move. The check verifies that the move completed successfully and that all the calculations were correct as to the end conditions.

The method and system for meeting end conditions in a motion control system, as described herein and shown in the appended figures, is illustrative only. Although only a few embodiments of the invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the appended claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the embodiments of the invention as expressed in the appended claims. Therefore, the technical scope of the present invention encompasses not only those embodiments described above, but all that fall within the scope of the appended claims.

The invention claimed is:

1. A method for outputting a move command in a motion control system to meet desired end conditions of a move, the method comprising:

prior to performing a move, generating a path profile in accordance with desired end condition between an initial position and a final position, the path profile having a known sample period, the move having a plurality of sample periods; and outputting a move command so that the desired end conditions are met, wherein generating the path profile comprises:

computing, a length of time remaining to complete the move along the path profile;

comparing the length of time remaining to a length of the known sample period;

substituting the length of time remaining for the length of the known sample period during a final sample period when the length of time remaining is shorter than the length of the known sample period.

2. The method of claim 1, further comprising:

checking values of actual end conditions at the final position of the move against the desired end conditions of the move.

3. The method of claim 1, wherein jerk is a constant value throughout the duration of the move.

4. A motion control system for controlling motion of a controlled element so that desired end conditions are met, the motion control system comprising:

a path generator for generating a path profile for a controlled element; and a motion controller for receiving at least one move command from the path generator and outputting them to the controlled element;

wherein the path generator is adapted and configured to:

prior to the controlled element performing a move, generate a path profile in accordance with desired end conditions between an initial position and a final position, the path profile having a known sampling period;

compute a length of time remaining to complete the move along the path profile;

compare the length of time remaining to a length of the known sample period; and substitute the length of time remaining for the length of the known sample period when the length of time remaining is shorter than the length of the known sample period.

5. The system of claim 4, wherein the path generator is a firmware subsystem of a microprocessor.

6. The system of claim 5, wherein the path generator is dedicated to path planning.

7. The system of claim 4, wherein the path generator is further configured to check values of actual end conditions at the final position of the move against the desired end conditions of the move.

8. The system of claim 4, wherein jerk is a constant value throughout the duration of the move.

* * * * *